June 18, 1968 J. T. RUSSELL 3,389,254
METHOD AND APPARATUS FOR NONDESTRUCTIVE DETERMINATION
OF U²³⁵ IN URANIUM
Original Filed Sept. 18, 1963 5 Sheets-Sheet 1
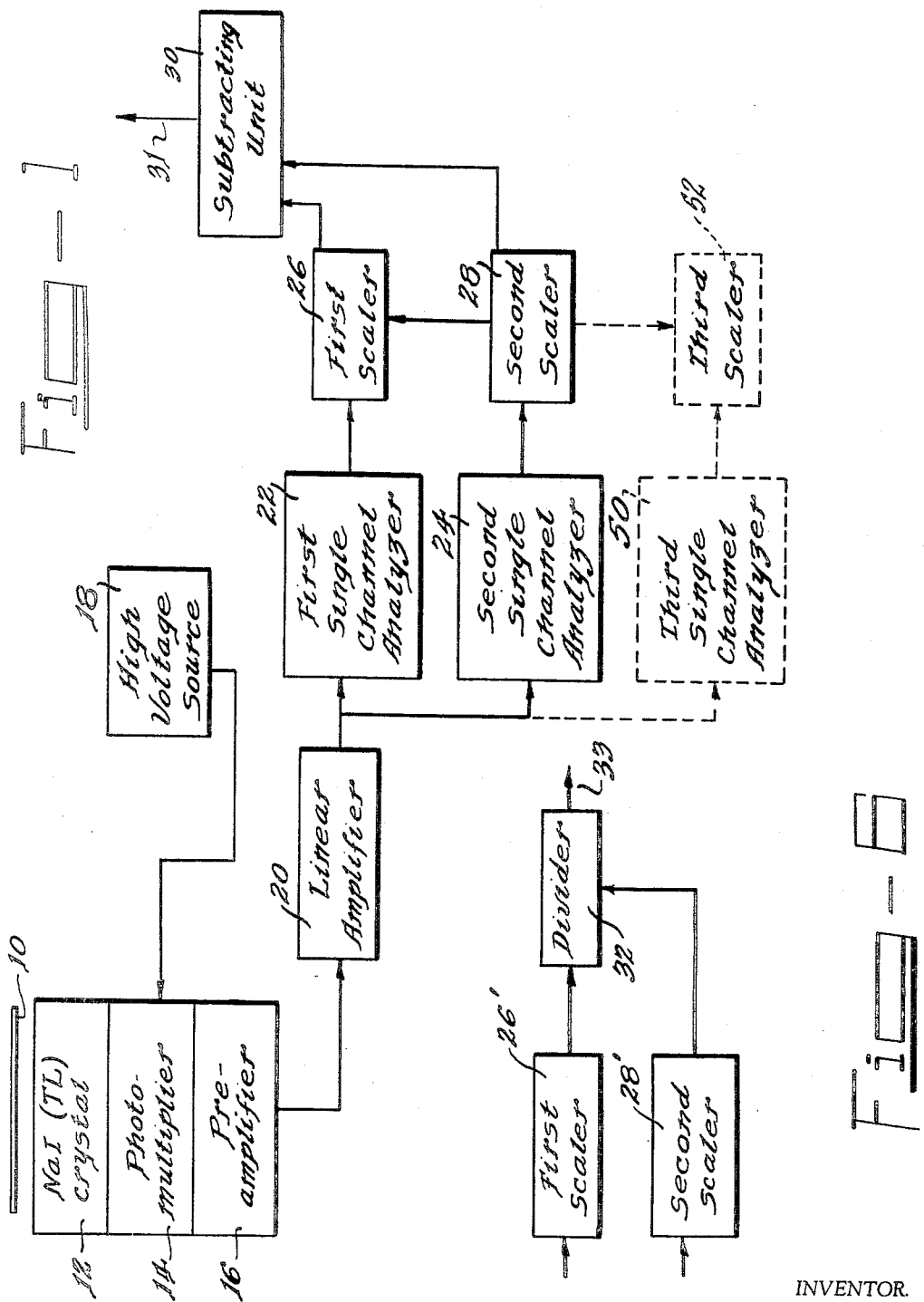
INVENTOR.
James T. Russell
BY
Roland G. Anderson
Attorney

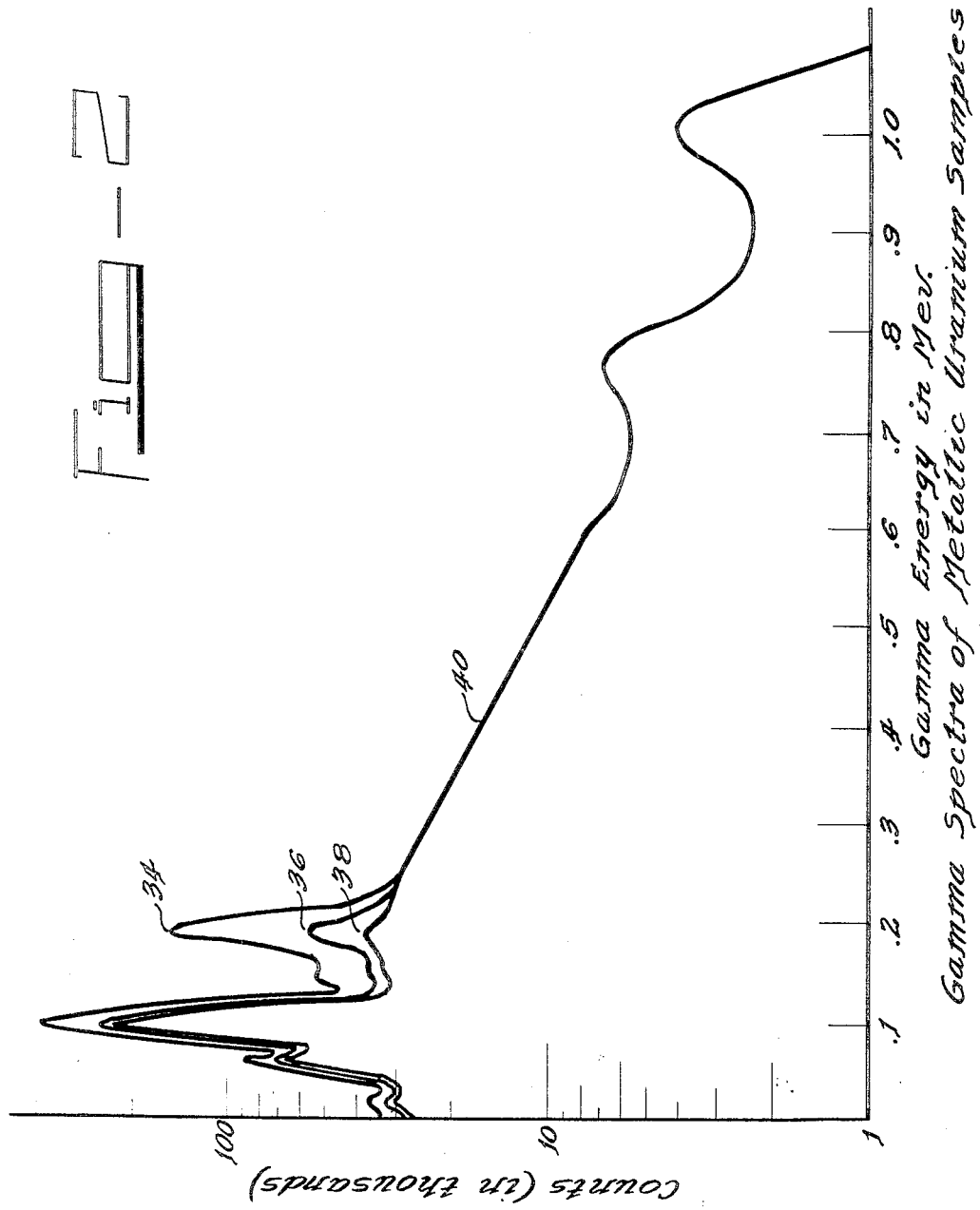

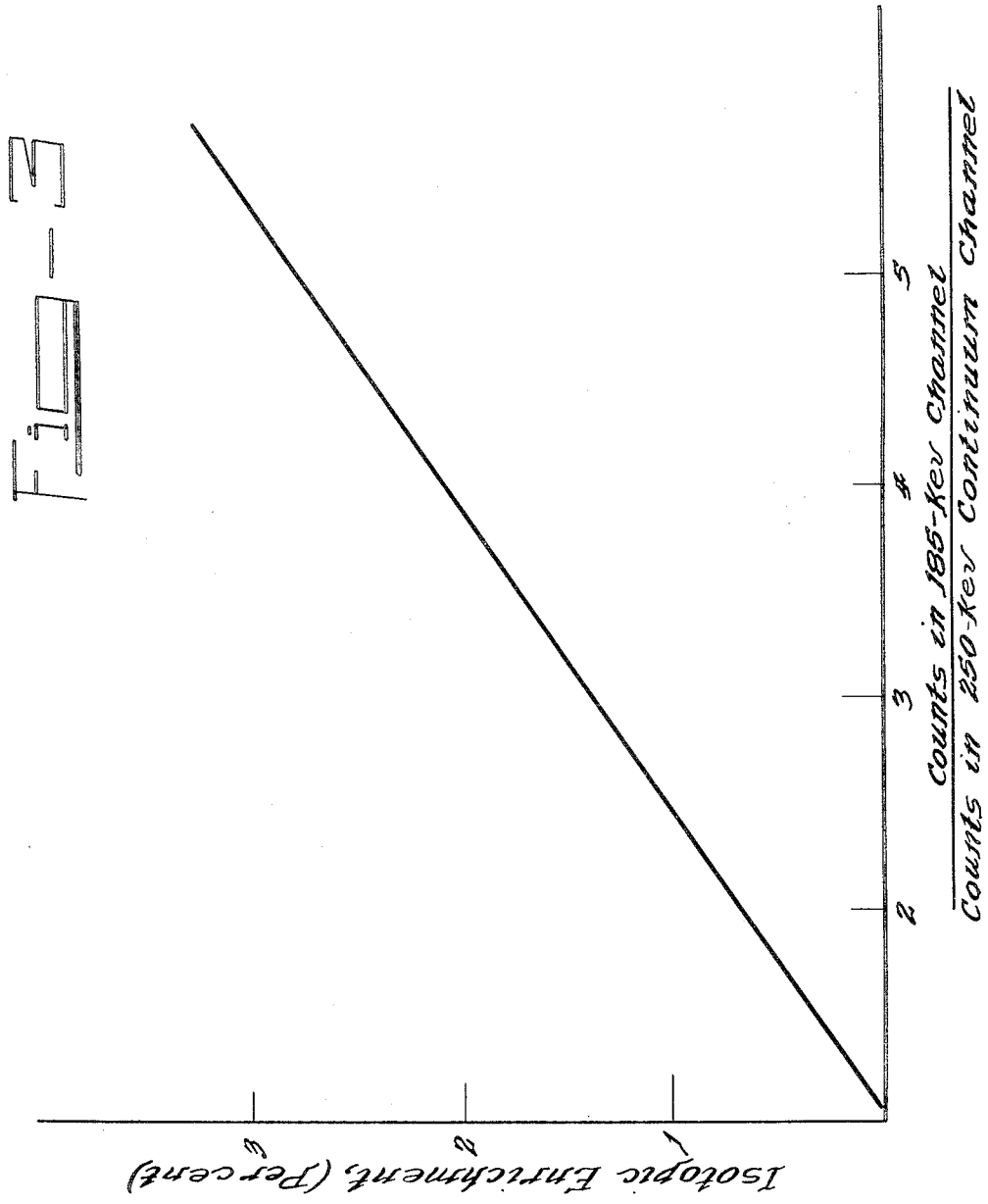

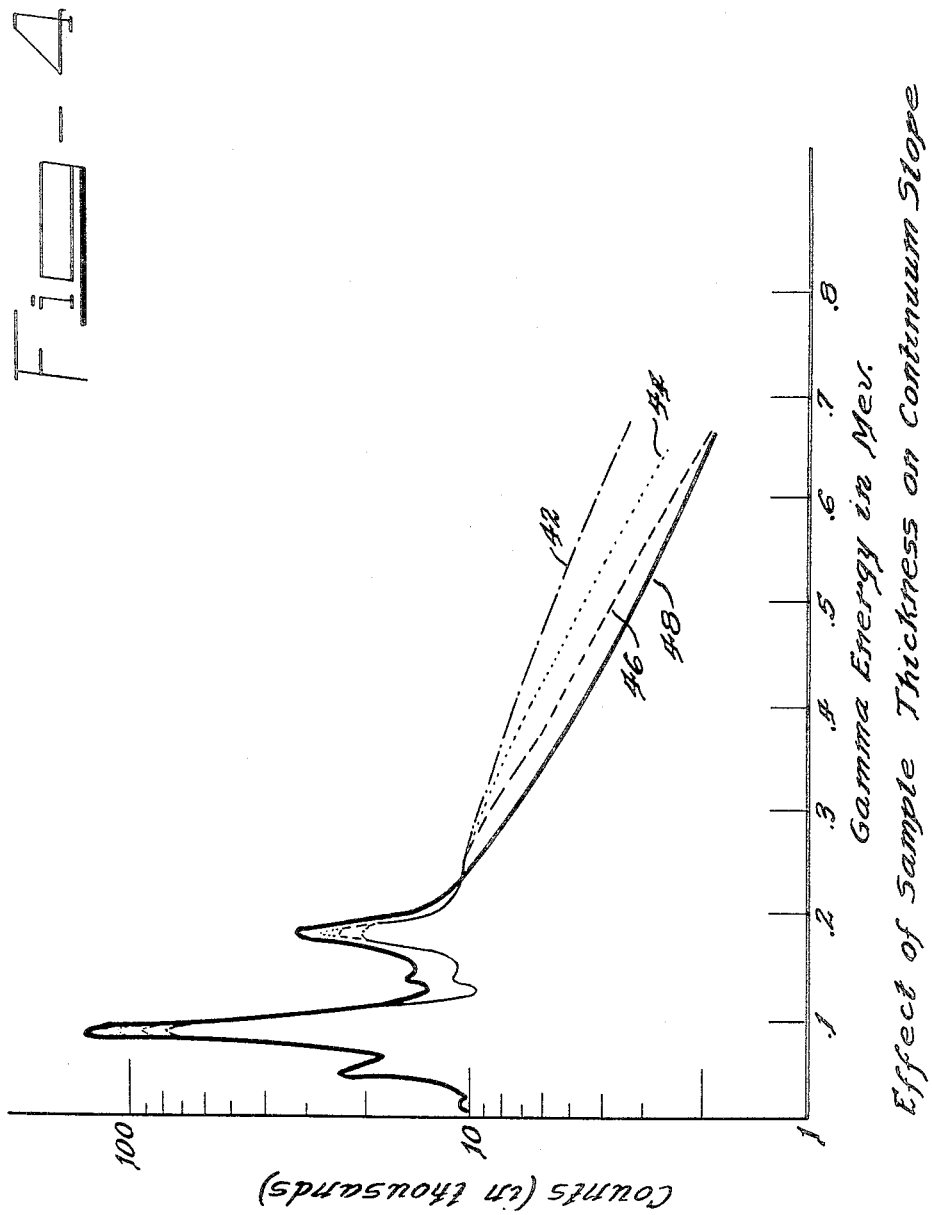

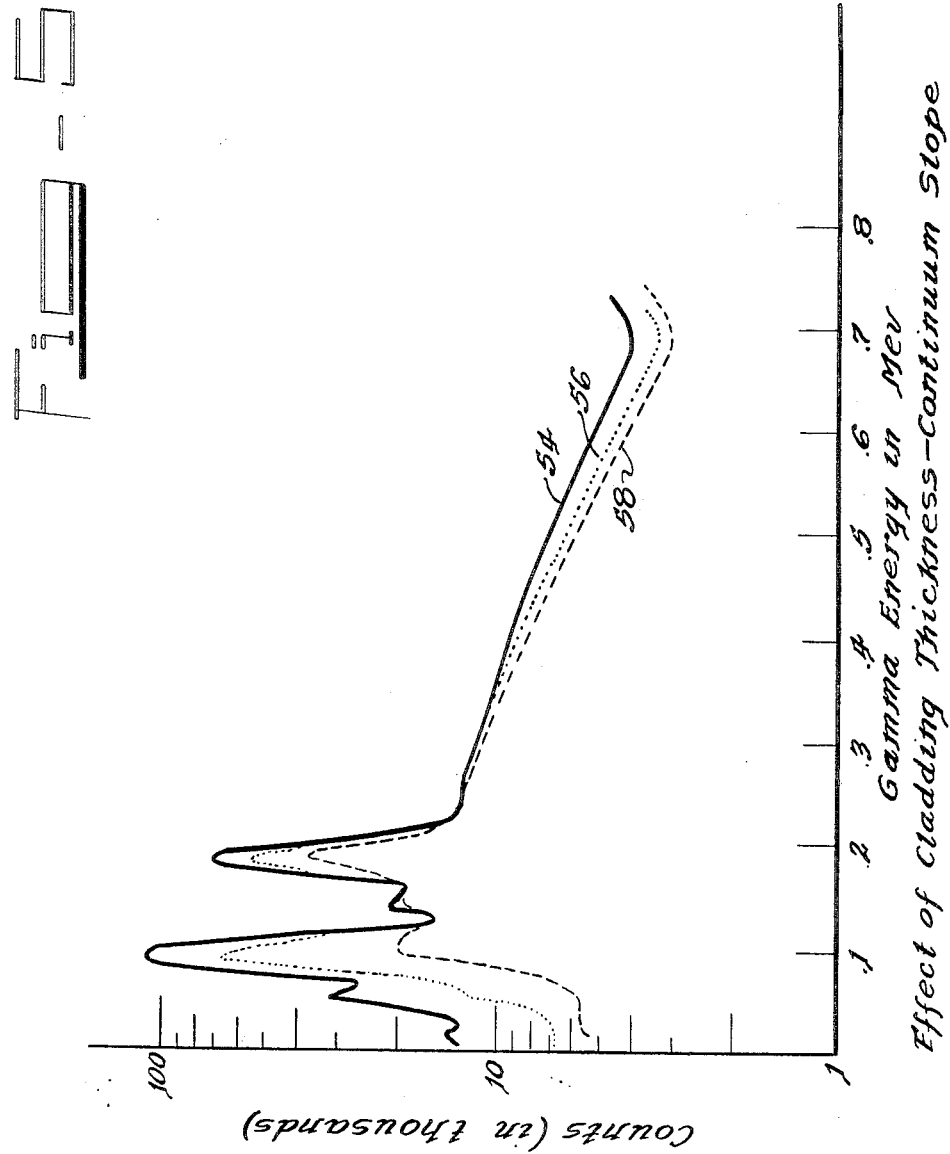

United States Patent Office 3,389,254
Patented June 18, 1968

3,389,254
METHOD AND APPARATUS FOR NONDESTRUC-
TIVE DETERMINATION OF U²³⁵ IN URANIUM
James T. Russell, Richland, Wash., assignor to the United
States of America as represented by the United States
Atomic Energy Commission
Continuation of application Ser. No. 309,907, Sept. 18,
1963. This application Aug. 29, 1967, Ser. No. 681,042
8 Claims. (Cl. 250—71.5)

ABSTRACT OF THE DISCLOSURE

A method and apparatus for determining the relative concentration of $U^{235}$ and $U^{238}$ in a sample of uranium by detecting gamma rays emitted by the sample and measuring the ratio of the number of detected gamma rays having an energy equal to the characteristic 185-kev. $U^{235}$ peak and the number of detected gamma rays having an energy closely adjacent to but higher than the 185-kev. $U^{235}$ peak on the continuum of energies due to radioactive daughters of $U^{238}$.

Contractual origin of the invention

The invention described herein was made in the course of, or under, a contract with the United States Atomic Energy Commission.

Background of the invention

This application is a continuation of my copending application Ser. No. 309,907, filed Sept. 18, 1963, now abandoned.

This invention relates to a method and apparatus which permit a nondestructive determination of the relative amounts of $U^{235}$ and $U^{238}$ in a sample of metallic uranium.

Nondestructive analysis of uranium for relative $U^{235}$ content becomes important whenever reactor fuel elements of various degrees of enrichment in $U^{235}$ are fabricated, handled or stored under conditions where mix-ups are inevitable. Sorting or identifying such fuel elements by mass spectrometric analysis is out of the question. Neutron activation methods render such fuel elements unsafe to handle for a period of time. A method involving the measurement of the gamma spectrum of $U^{235}$ compared to spectra of known standards using one single-channel analyzer is subject to strict limitations of sample shape, size and position relative to the measuring instrument. The latter method is inaccurate when uranium samples to be identified differ slightly in thickness, and differ in cladding composition or thickness. Small errors in position of the sample relative to a sensing element, or small variations in the location of uranium within a jacket or cladding will cause surprisingly large changes in counting rate in such a method.

The apparatus of the present invention provides for non-destructive analysis of uranium samples in a way that largely overcomes these difficulties. This apparatus makes it possible to rapidly analyze or sort uranium samples which have various degrees of isotopic enrichment and which vary in size, shape and in cladding thickness and composition.

The gamma spectrum of uranium containing some $U^{235}$ has two features of particular importance to the present invention. One is a distinct peak at 185-kev. gamma energy level which is due to gamma emission from $U^{235}$. The other is a background or continuum due to gamma rays emitted at a number of energy levels by the radioactive daughters of $U^{238}$, such as $Th^{234}$ and $Pa^{234}$. This continuum portion of the gamma spectrum extends from about .7-mev. (700-kev.) to zero energy and contains about twenty gammas from various isotopes. These gammas, which are indirectly characteristic of $U^{238}$, together with the Compton distributions of each gamma line, combine to form a relatively smooth continuum from somewhat less than 185-kev. to about 700-kev. with the 185-kev. peak characteristic of $U^{235}$ superimposed thereon.

Summary of the invention

Compton scattering is usually regarded as an objectionable effect since variations in sample size, shape and in cladding characteristics cause undesirable changes in continuum slope. However, I have devised an apparatus to be used in determining isotopic enrichment which takes advantage of the Compton scattering effect. I have found that with the apparatus of the present invention a surprisingly accurate determination of the isotopic enrichment, or ratio of $U^{235}$ to $U^{238}$, may be made by obtaining the ratio of the number of counts at 185-kev. to the number of counts at a point on the continuum adjacent to the 185-kev. peak. The ratio of these counts, which are obtained simultaneously, is a function of the ratio of $U^{235}$ to $U^{238}$ and may therefore be converted thereto by a suitable table or graph or by automatic means.

This apparatus provides a measurement of the ratio of $U^{235}$ to $U^{238}$ in a sample with an unexpected advantage in that it is possible to overcome the difficult problem of determining the enrichment of metallic uranium components of various sizes and shapes. In fact, this apparatus may be readily adapted to give reasonably accurate determinations of isotopic enrichment where samples vary in cladding thickness as well as in shape, or geometry.

Brief description of the drawings

Other advantages of the present invention will be apparent from the following description and the drawings in which:

FIG. 1 is a block diagram showing the apparatus of this invention;

FIG. 2 is a graph showing typical gamma spectra for several uranium samples differing in isotopic enrichment;

FIG. 3 is a graph showing a convenient means for converting a ratio of counts to percent enrichment;

FIG. 4 is a graph showing the effect of sample thickness on the slope of the continuum;

FIG. 5 is a graph showing the effect of cladding thickness on the slope of the continuum in which the cladding is stainless steel; and FIG. 6 is a modification of the block diagram of FIG. 1 showing alternate means for automatic readout.

Preferred embodiment of the invention

In FIG. 1 gamma rays emitted by a sample 10 cause scintillations in a crystal 12 which may be a conventional NaI (T1) crystal. The scintillations, which are proportional in intensity to the energy of the gamma rays causing the scintillations, are detected by a conventional photomultiplier unit 14 which is fed by a high voltage source 18 and which converts the light energy of a scintillation into a corresponding electrical impulse. This impulse is amplified by a preamp unit 16, giving an output signal which is fed into a linear amplifier 20. The output signal from the amplifier 20 is fed into both a first single-channel analyzer 22 and a second single-channel analyzer 24. The first analyzer 22 is adjusted to detect the signals resulting from 185-kev. energy gamma rays emitted by $U^{235}$ and by radioactive daughters of $U^{238}$, and to feed an impulse for each such gamma ray into a first scaler 26 which records the total number of such impulses. The second analyzer 24 is adjusted to detect the signals resulting from the continuum at a specific energy level closely adjacent the 185-kev. peak, such as 250-kev., which is also characteristic of gamma rays emitted by radioactive daughters of $U^{238}$.

The signal from the second analyzer 24 is fed into a second scaler 28 which records the number of impulses from the second analyzer. The second scaler 28 is preset to always stop the counting in both scalers 26 and 28 when the second scaler 28 reaches a predetermined number. The readings of the first scaler 26 and second scaler 28 are taken off and fed either as corresponding electrical or mechanical signals to a conventional electrical or mechanical subtracting unit 30 wherein the count of the second scaler is subtracted from that of the first scaler. The output signal at 31 is then proportional to the ratio of $U^{235}$ to $U^{238}$ and it may be read on a meter or recorded in any convenient manner.

Considering the theory involved, to a close approximation, the 250-kev. measurement represents the $U^{238}$, or continuum, contribution to the 185-kev. measurement. Therefore, it can be stated that the count recorded by the first scaler 26 is equal to some constant, $K_1$, times the amount of $U^{235}$ present plus another constant, $K_2$, times the amount of $U^{238}$ present, and the count recorded by the second scaler 28 is equal to some constant, $K_2$, times the amount of $U^{238}$ present. Therefore, the output signal 31 from the subtracting unit 30 is equal to $K_1$ times the amount of $U^{235}$ present. Since the preset second scaler 28 always stops after recording emissions proportional to the same absolute amount of $U^{238}$, the output signal 31 of the subtracting unit 30 is proportional to the ratio of $U^{235}$ to $U^{238}$. The proportionality constant can be most conveniently obtained empirically by runs on samples of known isotopic enrichment.

If desired, the subtracting unit 30 may be dispensed with and percent enrichment determined graphically from the ratio of the counts. In such case, it is most convenient for the preset count of the second scaler 28 to be set at a power of 10, i.e. $10^3$, $10^4$, etc. In such case, the count obtained by the first scaler 26 is equal to the ratio of counts at 185-kev. to counts at 250-kev. times that power of ten. Therefore, with such a preset count, the reading of the first scaler 26 may be readily transported by the operator to a ratio of counts. This ratio of counts may then be converted to percent enrichment by reference to a table or to a graph such as that shown in FIG. 3.

As shown in FIG. 6, the preset stopping feature of the scalers can be eliminated and the readings of scalers 26' and 28' fed to a conventional dividing means 32 which produces an output signal 33 proportional to the ratio of 185-kev. counts to 250-kev counts. Since, as indicated by FIG. 3, such an output signal has a linear relationship to isotopic enrichment, the output signal could be fed to a meter from which isotopic enrichment, or $U^{235}$ to $U^{238}$ ratio, could be read directly on a properly calibrated meter scale.

In FIG. 6, the scalers 26' and 28' may be replaced by conventional count rate meters, if desired, to provide continuous signals corresponding to the 185-kev. and 250-kev. intensities. The output signal 33 would then provide a continuous measure of the ratio of the intensities and it would have the same linear relationship to isotopic enrichment. Scalers 26' and 28' of FIG. 6 could also be replaced, if desired, by conventional logarithmic count rate meters. In such case, however, their outputs would have to be subtracted rather than divided and the ultimate output signal obtained would correspond to the log of the ratio of the 185-kev. and 250-kev. intensities. Any of these embodiments represented by FIG. 6 may include a properly calibrated meter for converting the output signal 33 into percent isotopic enrichment or $U^{235}$ to $U^{238}$ ratio.

In FIG. 2 the peak 34 is due to gamma rays of 185-kev. energy emitted by metallic uranium containing 3 percent $U^{235}$. Peak 36 is similarly characteristic of natural uranium containing 0.72 percent $U^{235}$, while peak 38 is similarly characteristic of a depleted uranium sample containing 0.15 percent $U^{235}$. Also shown in FIG. 2 is a continuum 40 which has a fairly uniform slope between about 250-kev. and about 600-kev.

The slope of the continuum 40 as shown in FIG. 2 remains relatively unchanged for minor variations in sample thickness—variations which would cause major difficulties in counting by other methods. Major changes in the thickness of samples cause changes in the slope of the continuum as shown in FIG. 4, in which continuums 42, 44, 46 and 48 show the slopes which may be expected from samples of metallic, natural uranium having thicknesses of 1 inch, $\frac{3}{16}$ inch, $\frac{1}{16}$ inch, and $\frac{1}{32}$ inch, respectively. As shown in FIG. 4 the slope of the continuum decreases as the sample thickness is increased.

If a sample is thin, there is a lower probability for Compton scattering of gamma rays emitted by the sample. This effect causes the 185-kev. peak to be higher relative to the adjacent continuum. For a thicker sample having the same enrichment the 185-kev. peak is lower relative to the adjacent continuum. However, at higher energy levels (up to about 600-kev.) the continuum for thick samples is higher than for thin samples. These effects are shown graphically in FIG. 4.

The apparatus of the present invention is ideally suited to cope with such variations in slope and to provide a signal which may be used to adjust final results to compensate for the effect of sample thickness. This may be accomplished, if desired, as shown in dashed lines in FIG. 1 by the addition of a third single-channel analyzer 50 to the output of the linear amplifier 20, which analyzer is adjusted to detect signals for those gamma rays having an energy level at some particular point along the smooth portion of the continuum between about 250-kev. and about 600-kev., such as at 350-kev.

A third scaler 52 receives the output signal from the third analyzer 50, counting the impulses due to 350-kev. gamma rays, for example, until such counting is terminated by the stopping signal from the preset second scaler 28. The difference in counts between the 250-kev. and 350-kev. energy levels gives a measure of the slope of the continuum which may be used to obtain a more reliable determination of percent enrichment either graphically or through tables. Such graphs or tables may be established empirically by use of standards of various thicknesses and of known enrichments by one skilled in the art.

As shown in FIG. 5, a somewhat similar change in the slope of the continuum occurs for differences in cladding thickness. However, in this case, the slope of the continuum increases with increased cladding thickness, and the relative height of the 185-kev. peak decreases. Continuum 54 which is for a metallic, natural uranium sample having no cladding, has a slope less steep than the slopes for clad samples. Continuum 56 shows how much the effects of $\frac{1}{8}$ inch stainless cladding increases the slope, while the effects of $\frac{3}{8}$ inch stainless steel cladding is shown by continuum 58. Similar effects will be obtained with other cladding materials such as alloys of zirconium, aluminum, etc.

When samples vary in cladding thickness, the difference in counts between the 250-kev. and 350-kev. energy levels gives the slope of the continum which may be converted into a correction factor in order to obtain a more reliable determination of enrichment. The correction factors may be obtained from graphs or tables established empirically by the use of standards having known thicknesses of cladding.

If the samples are identical in size and in type of cladding, a two-channel system using the first and second single-channel analyzers will allow determinations having an accuracy within about two percent of the actual percent enrichment. Where the samples are, for example, of variable thicknesses of $\frac{1}{4}$ inch or more, a two-channel system will permit determinations of enrichment to within about ten percent, while a three-channel system will allow an accuracy approaching three or four percent. Such accuracies are difficult, if not impossible, to obtain by any other nondestructive methods.

The present invention is based on the assumption that the uranium samples have an equilibrium concentration of $Th^{234}$, the immediate decay product of $U^{238}$. If it has been less than about 160 days since the last chemical separation of the material in the samples, additional corrections for the continuum height and the 185-kev. peak height should be computed if accurate ratios are desired. These computations may be made by one skilled in the art and do not form a part of this invention.

It is to be understood that the invention is not to be limited to the details given herein, but that it may be modified within the scope of the appended claims.

The embodiments of the invention in which an exclusive property or privilege is claimed are defined as follows:

1. A method of determining the ratio of $U^{235}$ to $U^{238}$ in a sample of uranium comprising:
   (1) detecting gamma rays emitted by said sample;
   (2) counting the number of detected gamma rays having an energy closely adjacent to but higher than the 185-kev. $U^{235}$ peak on the continuum of energies due to radioactive daughters of $U^{238}$;
   (3) simultaneously counting the number of detected gamma rays having an energy equal to the characteristic 185-kev. $U^{235}$ peak; and
   (4) obtaining a physical measure of the ratio of the two resulting counts.

2. The method of claim 1 wherein said energy closely adjacent to but higher than the characteristic 185-kev. $U^{235}$ peak is about 250 kev.

3. A method of determining the ratio of $U^{235}$ to $U^{238}$ in a sample of uranium comprising:
   (1) detecting gamma rays emitted by said sample;
   (2) counting a predetermined number of detected gamma rays having an energy closely adjacent to but higher than the characteristic 185-kev. $U^{235}$ peak on the continuum of energies due to radioactive daughters of $U^{238}$; and
   (3) counting, during the time duration required to count said predetermined number, the number of detected gamma rays having an energy equal to the characteristic 185-kev. $U^{235}$ peak.

4. The method of claim 3 wherein said energy closely adjacent to but higher than the characteristic 185-kev. $U^{235}$ peak is about 250 kev.

5. The method of claim 4 wherein the actual value of said predetermined number is a power of ten.

6. A method of determining the ratio of $U^{235}$ to $U^{238}$ in a sample of uranium comprising:
   (1) detecting gamma rays emitted by said sample;
   (2) counting the number of detected gamma rays having energies equal to first and second energy levels on the continuum of energies due to radioactive daughters of $U^{238}$, said first energy level being between the characteristic 185-kev. $U^{235}$ peak and said second energy level;
   (3) simultaneously counting the number of detected gamma rays having an energy equal to the characteristic 185-kev. $U^{235}$ peak; and
   (4) obtaining a physical measure of the ratio of the number of counts of detected gamma rays having an energy equal to the characteristic 185-kev. $U^{235}$ peak and the number of counts of detected gamma rays having an energy equal to said first energy level, the count resulting from detected gamma rays having said second energy level being dependent on the slope of the continuum, said slope being indicative of corrections applicable to said ratio due to sample thickness or cladding thickness.

7. The method of claim 6 wherein said first energy level is about 250 kev. and said second energy level is about 350 kev.

8. An apparatus for determining the $U^{235}$ to $U^{238}$ ratio in a sample of uranium comprising:
   means for detecting gamma rays emitted by uranium and producing pulses corresponding to the energy of such rays;
   a first single-channel analyzer connected to said means for distinguishing gamma rays having an energy of 185 kev.;
   a second single-channel analyzer connected to said means for distinguishing gamma rays having an energy level of about 250 kev. which is characteristic of a continuum of energies due to radioactive daughters of $U^{238}$;
   a third single-channel analyzer connected to said means for distinguishing gamma rays having an energy level of about 350 kev. which is also characteristic of the said continuum;
   first, second, and third scalers connected to said first, second, and third analyzers, respectively, said second scaler being preset to shut off all scalers at a preset count; and
   means for providing a signal equal to the difference between counts recorded by said first scaler and said preset second scaler, whereby said signal is directly proportional to the $U^{235}$ to $U^{238}$ ratio, the count recorded by said third scaler being dependent on the slope of the continuum, said slope being indicative of corrections applicable to said ratio due to sample thickness or cladding thickness.

References Cited

UNITED STATES PATENTS

| | | | |
|---|---|---|---|
| 2,993,122 | 7/1961 | Mero | 250—83.3 |
| 3,018,374 | 1/1962 | Pritchett | 250—71.5 |
| 3,035,174 | 5/1962 | Turner et al. | 250—83.3 |
| 3,105,149 | 9/1963 | Guitton et al. | 250—71.5 |
| 3,114,835 | 12/1963 | Packard | 250—71.5 |

RALPH G. NILSON, *Primary Examiner.*

S. ELBAUM, *Assistant Examiner.*